(12) United States Patent
Obernosterer et al.

(10) Patent No.: US 7,362,819 B2
(45) Date of Patent: Apr. 22, 2008

(54) DEVICE AND METHOD FOR REDUCING PEAKS OF A COMPOSITE SIGNAL

(75) Inventors: Frank Gerhard Ernst Obernosterer, Bavaria (DE); Kumud Kumar Sanwal, Middlesex, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 226 days.

(21) Appl. No.: 10/867,753

(22) Filed: Jun. 16, 2004

(65) Prior Publication Data

US 2005/0281345 A1 Dec. 22, 2005

(51) Int. Cl.
*H03K 9/10* (2006.01)
*H03K 7/00* (2006.01)
*H04L 25/49* (2006.01)

(52) U.S. Cl. ............... 375/296; 375/297; 375/298; 332/106; 332/107

(58) Field of Classification Search .......... 375/285, 375/295–298, 260; 370/252, 522–528; 455/63, 455/67.1, 115; 332/107, 123–128, 159, 160, 332/106, 117
See application file for complete search history.

(56) References Cited

U.S. PATENT DOCUMENTS 6,654,427 B1 11/2003 Ma et al.
2003/0086507 A1 5/2003 Kim et al.

OTHER PUBLICATIONS

Tellado et al, "PAR Reduction with minimal or zero bandwidth loss and low complexity", Jun. 1-5, 1998, pp. 1-12.*
Gatherer and Polley, "Controlling Clipping Probability in DMT Transmission", Conference Record of the Thirty-First Asilomar Conference on Signals, Systems and Computers 1997, vol. 1, Nov. 2-5, 1997, pp. 578-584.*
Cioffi et al, Understanding Digital Subscriber Line Technology, Prentice Hall PTR, pp. 235-242.*

* cited by examiner

*Primary Examiner*—David C. Payne
*Assistant Examiner*—Linda Wong (57) ABSTRACT

A method of limiting at least one peak of a composite signal having multiple carriers signals involves placing energy in at least one bandwidth gap located between respective frequency bandwidths of carrier signals.

10 Claims, 6 Drawing Sheets

DEVICE AND METHOD FOR REDUCING PEAKS OF A COMPOSITE SIGNAL

BACKGROUND OF THE INVENTION

1. Field of the Invention

The present invention generally relates to a device and method for limiting peaks of a signal and, more particularly, to a device and method for reducing the peak-to-average ratio ("PAR") of a composite signal including at least two carrier signals at respective frequency bandwidths.

2. Description of Related Art

RF power amplifiers are widely used to transmit signals in communication systems. Ideally, the power amplifier would provide a uniform gain throughout a dynamic range so that the output signal of the amplifier is a correct, amplified version of an input signal. In reality, however, power amplifiers do not exhibit perfect linearity; i.e., they introduce distortion (e.g., non-linear amplitude distortion and non-linear phase distortion). Whether the power amplifier is operating in a linear or nonlinear region may depend on the amplitude of the input signal. If the input signal has an amplitude that causes the power amplifier to operate outside the linear regions, the power amplifier may introduce non-linear components or distortion into the signal.

By reducing the peaks of an input signal to the power amplifier, the peak-to-average ratio ("PAR") of the input signal may be reduced, thereby increasing the average power output by the power amplifier. Put differently, a power amplifier operates with increasing efficiency as the input signals to be amplified have a decreasing PAR. Therefore, techniques have been implemented to reduce the PAR of the input signal, thereby increasing the efficiency of the power amplifier.

One conventional method for reducing the PAR of an input signal is "clipping." As the name implies, this method involves clipping peaks of the input signal to a threshold lower than a desired PAR, followed by filtering. By clipping the signal peaks, a noise-like signal is added to the input signal, thereby generating a clipped signal. When the input signal is clipped, the effect in the frequency domain is to add the spectrum of a noise-like signal to the input signal spectrum (i.e., "in-band" noise).

Although clipping techniques are generally thought to provide acceptable results, they are not without shortcomings. For example, it has been found that the signal peaks may return after filtering the clipped signal. Accordingly, it becomes necessary to again detect and clip the signal peaks to a new limit lower than the detection threshold.

Another shortcoming is that conventional clipping techniques may introduce undesirable spectral features in the signal to be transmitted; e.g., the clipped signal may deviate from its original waveform. In this respect, the clipping techniques fail to adequately address the problems of reducing the PAR of an input signal while also preserving the signal integrity within the error vector measurements ("EVM") of the applicable technology standard (e.g. CDMA, UMTS, or other existing and future standards) for the receiver of the transmitted signal.

Another shortcoming associated with "clipping" techniques (as well as all other PAR reducing techniques) is that they keep the frequency spectrum of the noise-like signal within the frequency spectrum of the useful signal. This "in-band" noise contributes to the EVM, which (from a conceptual standpoint) may be thought of as the in-band distortion of the transmit signal.

SUMMARY OF EMBODIMENTS OF THE INVENTION

Exemplary embodiments of the present invention take advantage of the bandwidth gaps that are usually located between respective frequency bandwidths of carrier signals of a composite signal.

In an exemplary embodiment of the present invention, a method is provided for limiting at least one peak of a composite signal having at least two carrier signals at respective frequency bandwidths. The method may involve generating a correction signal based on at least one detected peak of the composite signal so that the correction signal has a spectral shape that places energy in at least one bandwidth gap located between the respective frequency bandwidths of the carrier signals. The correction signal and the composite signal may be combined so that the correction signal is located at the detected peak in time domain. The peak of the carrier signal may be detected from a window of samples of the composite signal. The detected peak may be multiplied by a clipping factor to calculate a complex number, which is multiplied by a sequence of clipping filter coefficients to determine the spectral shape of the correction signal. The generating step and the combining step may be repeated for a plurality of sample windows of the composite signal.

In another exemplary embodiment of the present invention, a system is provided for limiting at least one peak of a composite signal having at least two carrier signals at respective frequency bandwidths. The system may include a peak detector that detects at least one peak in the composite signal, and a clipping filter that generates a correction signal based on the detected peak, such that the correction signal has a spectral shape that occupies at least one bandwidth gap located between the respective frequency bandwidths. The system may also include a combiner that combines the correction signal and the composite signal so that the correction signal is located at the detected peak in time domain.

In another exemplary embodiment of the present invention, a device is provided that generates a correction signal for limiting at least one peak of a composite signal that has multiple carrier signals with respective frequency bandwidths, in which the correction signal is generated so as to have a spectral shape occupying at least one bandwidth gap between respective frequency bandwidths.

In another exemplary embodiment of the present invention, a device is provided that reduces peaks of an input composite signal that has multiple carrier signals with respective frequency bandwidths, such that a resulting composite signal has more energy occupying at least one bandwidth gap between respective frequency bandwidths of the carrier signals than the input composite signal.

BRIEF DESCRIPTION OF THE DRAWINGS

The present invention will become more fully understood from the detailed description below and the accompanying drawings, wherein like elements are represented by like reference numerals, which are given by way of illustration only and thus are not limiting of the present invention.

DETAILED DESCRIPTION OF EMBODIMENTS

Exemplary embodiments of the present invention pertain to a peak limiting (or "notching") technique that reduces the peak-to-average ratio ("PAR") of a composite signal. To facilitate understanding of the present invention, the description is presented in the following two sections. Section I discusses a peak limiting device and technique according to convention. Section II discusses a peak limiting device and technique according to an exemplary, non-limiting embodiment of the present invention.

Sections I and II discuss peak limiting techniques as applied to a digital complex valued baseband signal. Those skilled in the art will appreciate, however, that the same principles can be straightforwardly extended to limiting peaks of other signals, such as a digital intermediate frequency ("IF") signal for example.

Figure 1:
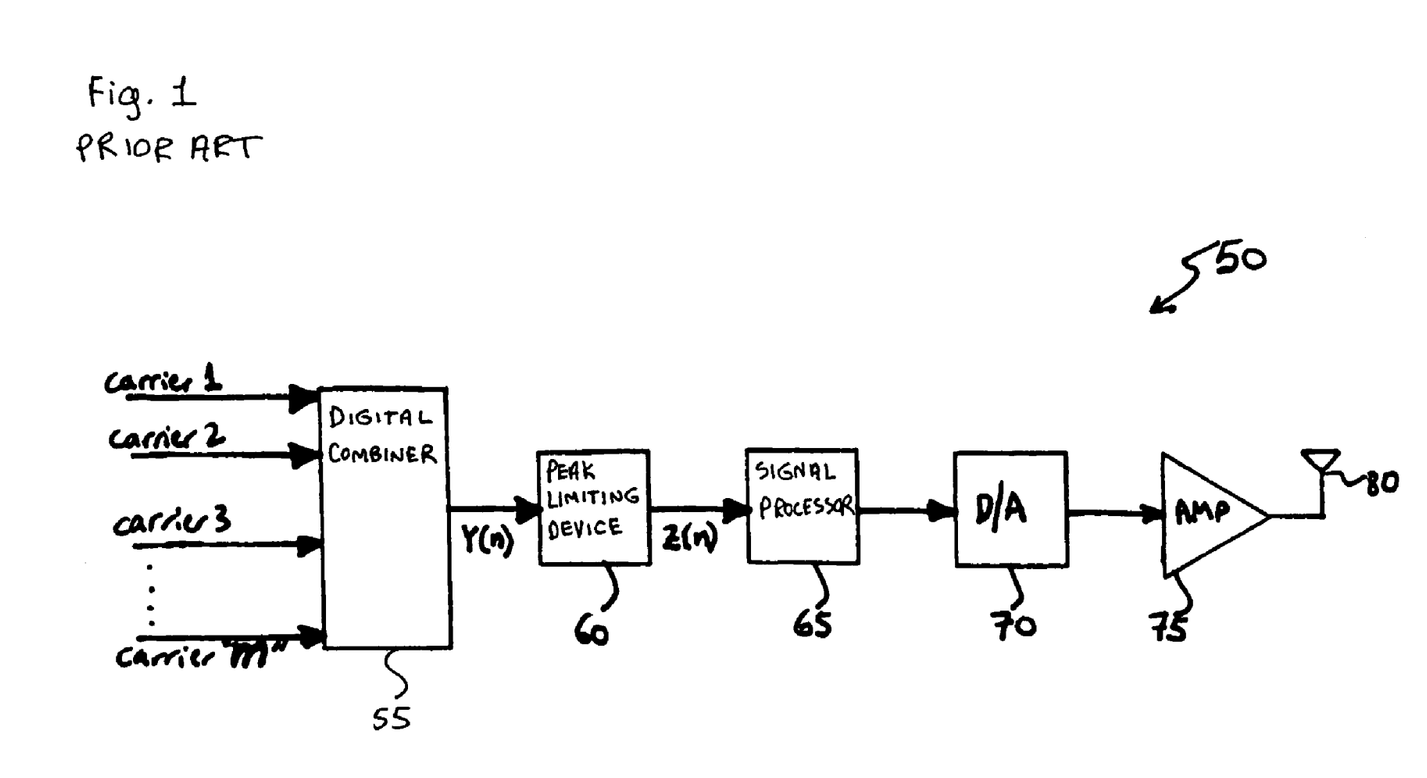
FIG. 1 is a schematic illustration of an exemplary system implementing a conventional peak limiting device and method.

I.—Conventional Peak Limiting Device and Technique:

FIG. 1 depicts an exemplary system 50 with a peak limiting device 60 that implements a signal notching technique according to convention. The system 50 may transmit analog signals for wireless applications. It will be appreciated, however, that the system 50 may be designed for wired applications inclusive of telephone and cable networks, for example.

The system 50 may include a digital combiner 55 that receives as inputs multiple carrier signals, which are respectively designated as carrier 1 through carrier m, and which are provided at respective frequency bandwidths. The digital combiner 55 combines the carrier signals to form a composite signal Y(n). The composite signal Y(n) is then processed by the peak limiting device 60. The peak limiting device 60 may compensate for a peak of the composite signal Y(n) above a threshold found within a window of samples. In so doing, the peak limiting device 60 reduces the PAR of the composite signal Y(n) by adding a spectrally matched correction signal. The resultant output signal Z(n) of the peak limiting device 60 may be processed by a signal processor 65, and converted from digital samples to an analog signal through a D/A converter 70. The analog signal generated by the D/A converter 70 may be fed to at least one power amplifier 75 for transmission through at least one antenna 80.

Figure 2:
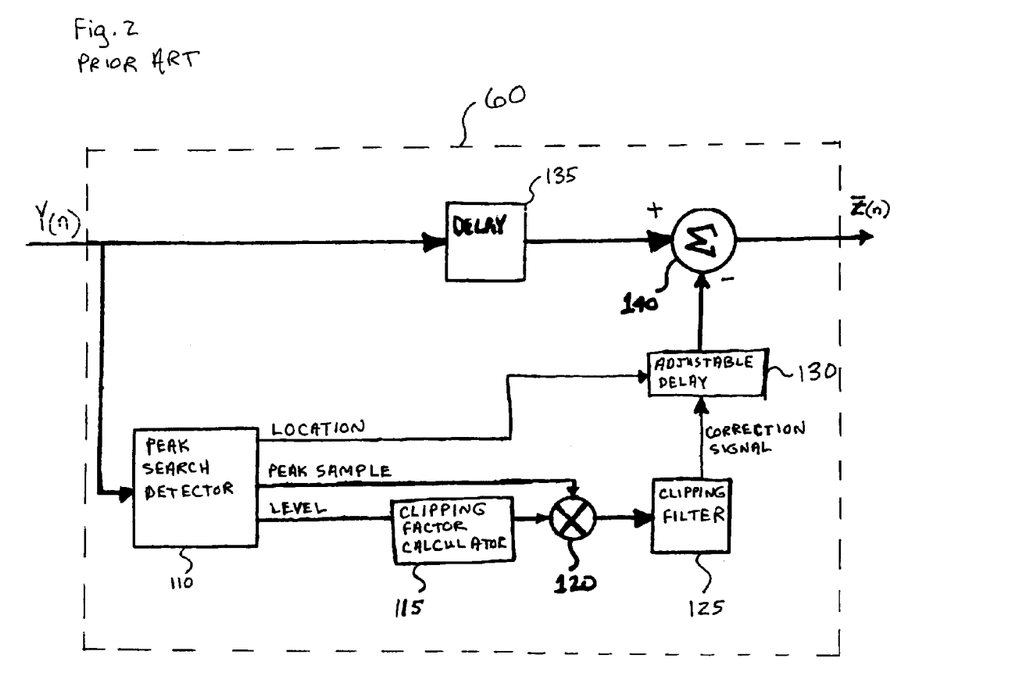
FIG. 2 is a schematic illustration of the conventional peak limiting device depicted in FIG. 1.

FIG. 2 schematically shows an exemplary architecture of the conventional peak limiting device 60. The peak limiting device 60 receives the composite signal Y(n) as an input. The composite signal Y(n) may be a series of input samples reflective of a series of complex numbers (e.g., in-phase and quadrature-phase components I and Q, respectively). The composite signal Y(n) includes a number m of distinct carrier signals reflected as carrier 1 through carrier m. The distinct carrier signals are digitally combined to form the composite signal Y(n). The peaks of the composite signal Y(n) may be limited by the peak limiting device 60.

Upon receiving the composite signal Y(n), the peak limiting device 60 forms a window of samples from a first set of samples of the composite signal Y(n). The window of samples may be a subset of the set of received samples. For example, the first set may include 1,000 samples, while each window may include eight (8) consecutive samples from the first set. The length or size (e.g., the number of samples) of each window may be determined by various and alternative methods that are well known in this art.

A peak search detector 110 searches for the highest peak within a window of samples. The peak search detector 110 may contemplate and compare each sample having a peak within that window to ascertain the highest peak. Consequently, the peak search detector 110 finds at least the highest peak within the window. The peak search detector 110 outputs the peak magnitude or level, the peak sample (e.g., the highest peak within the window), and the location of the peak.

A clipping factor calculator 115 receives the peak level from the peak search detector 110, and calculates a fraction (or clipping factor) necessary to reduce the found peak to a predetermined threshold level. The clipping factor calculator 115 may be realized by a look up table, and other alternatives that are well known in this art.

A multiplier 120 receives and multiplies the clipping factor determined by the clipping factor calculator 115 and the peak sample detected by the peak search detector 110. As a result, the multiplier 120 generates a clipping factor calculated complex number(s), which is then fed into a clipping filter 125.

The clipping filter 125 generates a correction signal that ensures the signal output from peak limiting device 60 is without out-of-band emissions. To this end, and with reference to FIG. 3, the clipping filter 125 may include a multiplier 126 having as inputs the clipping factor calculated complex number (i.e., the clipping factor multiplied by the peak sample) and clipping filter coefficients. The clipping filter coefficients may be supplied from a look up table 127, or some other suitable element.

Figure 3:
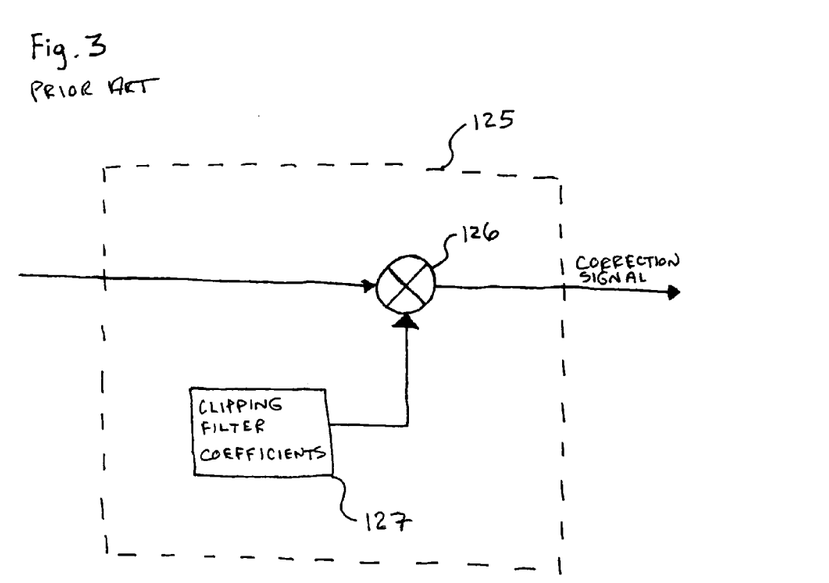
FIG. 3 is a schematic illustration of a conventional clipping filter.

As is well known in this art, the clipping filter coefficients are selected so that the correction signal has the desired spectral shape. The desired spectral shape is such that in the frequency domain, the energy of the correction signal is placed within the respective bandwidths of the carrier signals. The correction signal has a sufficient magnitude and polarity to reduce the magnitude of the highest peak found within the window to the predetermined threshold value, or, alternatively, below the predetermined threshold value. As is well known in this art, the clipping filter 125 may be realized by various schemes, including a finite impulse response ("FIR") design.

Turning back to FIG. 2, the peak limiting device 60 may also include a delay 135 and a combiner 140. The delay 135 provides a delay corresponding with the time necessary to create the correction signal. In response to receiving the window of samples (as delayed by the delay 135) and the correction signal as inputs, the combiner 140 generates an output Z(n). The output Z(n) may be characterized as the sum of these inputs, wherein at least the highest peak within the window is compensated for and reduced to or below the predetermined threshold. Consequently, the correction signal is time aligned with the highest peak sample within the window.

To insure that the correction signal is added at the appropriate location of the peak sample within the window, the peak limiting device 60 may include an adjustable delay 130. The adjustable delay 130 delays the correction signal with respect to the summing device 140. The adjustable delay 130 functionally corresponds with the location of the detected peak within the window.

It will be appreciated that more than one peak in a particular window of samples may be addressed by undergoing at least one more iterations through the peak limiting device 60. That is, several iterations of the peak location and peak clipping may be performed by the peak limiting device 60, depending on the requirements for the resulting PAR and the degree of clipping noise that may be tolerated.

The generated correction signal may be viewed as having inverse characteristics to the detected peak of the window of samples of the composite signal Y(n). The sum of the correction signal and the sample within the window having the highest peak causes that sample to fall at or below the predetermined threshold to reduce the PAR of the input signals. Once the highest peak within the window of samples is found and compensated for by generating the correction signal, a subsequent window may be formed from the remaining samples of the first set. This process may, as such, continue iteratively until all of the samples of the first set have processed through the peak limiting device 60. Likewise, once the first set of samples has been, for example, searched window by window for the highest peak of the samples, and a correction signal has been generated for each corresponding window, another set of samples may be received. The process then continues, window by window, until all of the samples of this next set have been processed by the peak limiting device.

Figure 4:
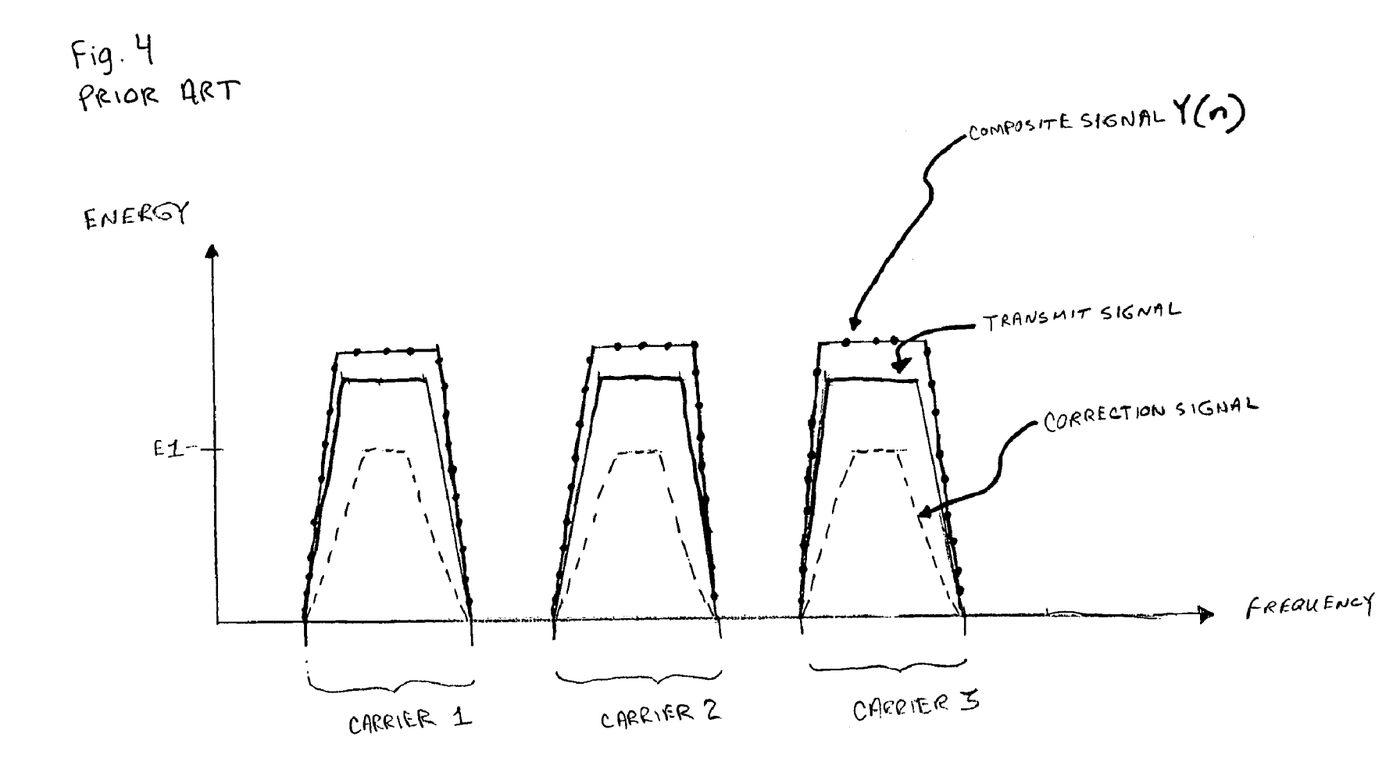
FIG. 4 is a power spectral energy chart associated with the conventional peak limiting device depicted in FIG. 2.

FIG. 4 is a power spectral energy graph showing the relationship between the energy and the frequency of signals. The graph depicts a composite signal Y(n) (shown in solid dotted lines), an exemplary correction signal (shown in dashed lines) that may be generated by the conventional power limiting device 60 and the resulting transmit signal (shown in solid lines). As shown, the composite signal Y(n) may have three carrier signals inclusive of carrier 1, carrier 2, and carrier 3. The carrier signals are provided at respective frequency bandwidths. The correction signal is shaped (by virtue of the clipping filter coefficients applied by the clipping filter 125) so that the energy thereof is placed within the respective bandwidths of the carrier signals. That is, in the frequency domain, the correction signal spectrally matches the composite signal (and the transmit signal). However, no particular use is made of the bandwidth gaps that exist between the bandwidth frequencies of the respective carrier signals. As shown, the correction signal has a power level of E1.

In FIG. 4, it will be appreciated that since the correction signal is subtracted from the peaks of the composite signal Y(n) (via the combiner 140), the resulting transmit signal has less energy than the composite signal Y(n). This subtraction feature is schematically illustrated in FIG. 2 via the "+" and "−" symbols associated with the respective inputs of the combiner 140.

Figure 5:
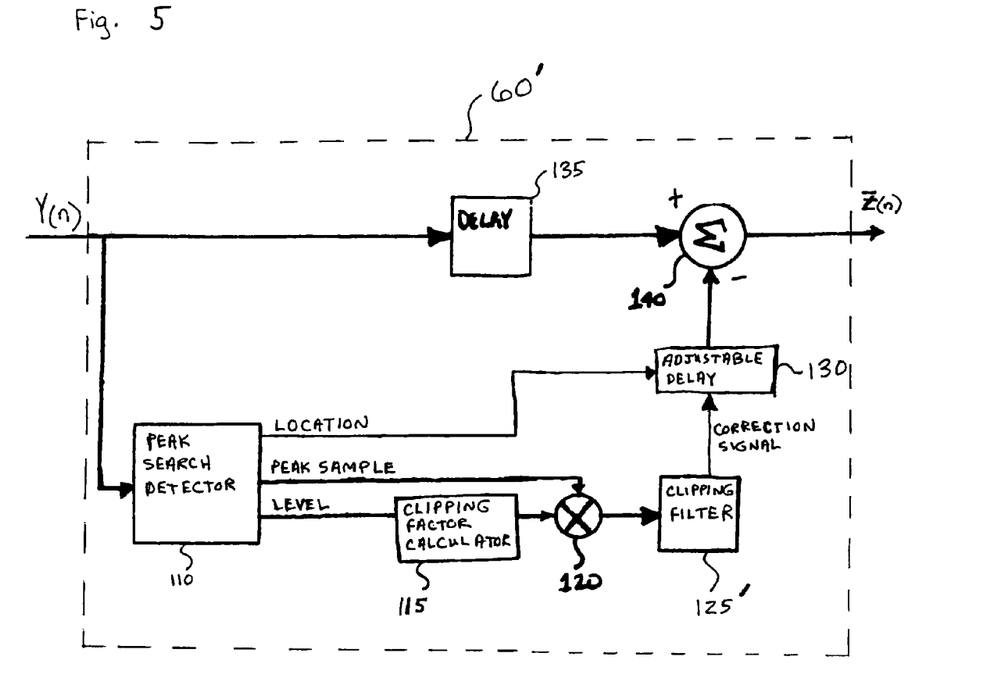
FIG. 5 is a peak limiting device according to an exemplary, non-limiting embodiment of the present invention.

II.—Exemplary, Non-limiting Embodiment of Peak Limiting Device and Technique:

A peak limiting device and technique according to an exemplary, non-limiting embodiment of the present invention may be implemented in the exemplary system 50 depicted in FIG. 1 (for example). FIG. 5 schematically illustrates a peak limiting device 60' according to an exemplary, non-limiting embodiment of the present invention.

As shown in FIG. 5, the peak limiting device 60' includes numerous components that are the same as those noted above with respect to the conventional peak limiting device 60. The same components have been designated with like reference numerals. For example, the peak search detector 110, the clipping factor calculator 115, the multiplier 120, the adjustable delay 130, the delay 135, and the combiner 140 of the peak limiting device 60' have functionalities that are the same as those of the corresponding elements of the peak limiting device 60 depicted in FIG. 2.

The peak limiting device 60' of FIG. 5 also includes a clipping filter 125' that generates a correction signal. In contrast to convention, however, the clipping filter 125' is designed to spectrally place at least some of the energy of the correction signal in the bandwidth gaps located between the respective frequency bandwidths of the carrier signals. The term "bandwidth gap" refers to a frequency range that exists between adjacent carrier frequencies of a composite signal system. Since a receiver may filter out the energy placed in the bandwidth gaps, this energy does not degrade the receiver's performance. The ability to place some of the correction signal's energy in the bandwidth gaps does, however, reduce the amount of error energy added in the in-band region for each carrier, thereby improving the receiver's performance.

Figure 6:
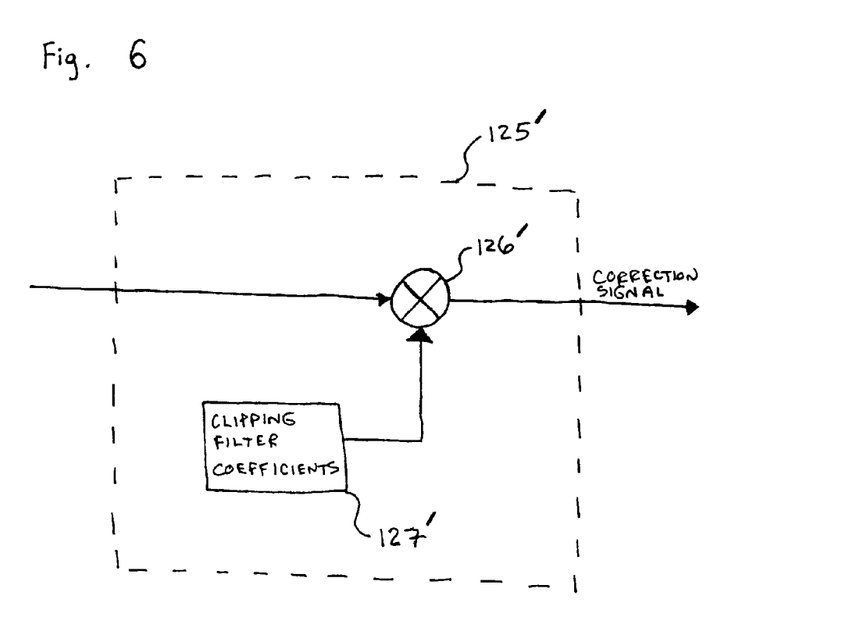
FIG. 6 is a clipping filter according to an exemplary, non-limiting embodiment of the present invention.

To this end, and with reference to FIG. 6, the clipping filter 125' may include a multiplier 126' having as inputs the clipping factor calculated complex number (i.e., the clipping factor multiplied by the peak sample) and clipping filter coefficients. The clipping filter coefficients may be supplied from a look up table 127', or some other suitable element.

The clipping filter coefficients are selected so that the correction signal has the desired spectral shape. The clipping filter coefficients will be discussed in greater detail below. In this case, the desired spectral shape is such that in the frequency domain, at least some of the energy of the correction signal is placed in the bandwidth gaps that are located between the respective bandwidths of the carrier signals.

The correction signal has a sufficient magnitude and polarity to reduce the magnitude of the highest peak found within the window to the predetermined threshold value, or, alternatively, below the predetermined threshold value. The clipping filter 125' may be realized by various schemes, including a finite impulse response ("FIR") design.

Turning back to FIG. 5, the peak limiting device 60' may also include a delay 135 and a combiner 140. The delay 135 provides a delay corresponding with the time necessary to create the correction signal. In response to receiving the window of samples (as delayed by the delay 135) and the correction signal as inputs, the combiner 140 generates an output Z(n). The output Z(n) may be characterized as the sum of both of these inputs, wherein at least the highest peak within the window is compensated for and reduced to or below the predetermined threshold. Consequently, the correction signal is time aligned with the highest peak sample within the window.

To insure that the correction signal is added at the appropriate location of the peak sample within the window, the peak limiting device 60' may include an adjustable delay 130. The adjustable delay 130 delays the correction signal with respect to the summing device 140. The adjustable delay 130 functionally corresponds with the location of the detected peak within the window.

It will be apparent to those skilled in the art that the iterative characteristics discussed in section I with respect to the conventional peak limiting device 60 may be straightforwardly applied to the present peak limiting device 60'.

Figure 7:
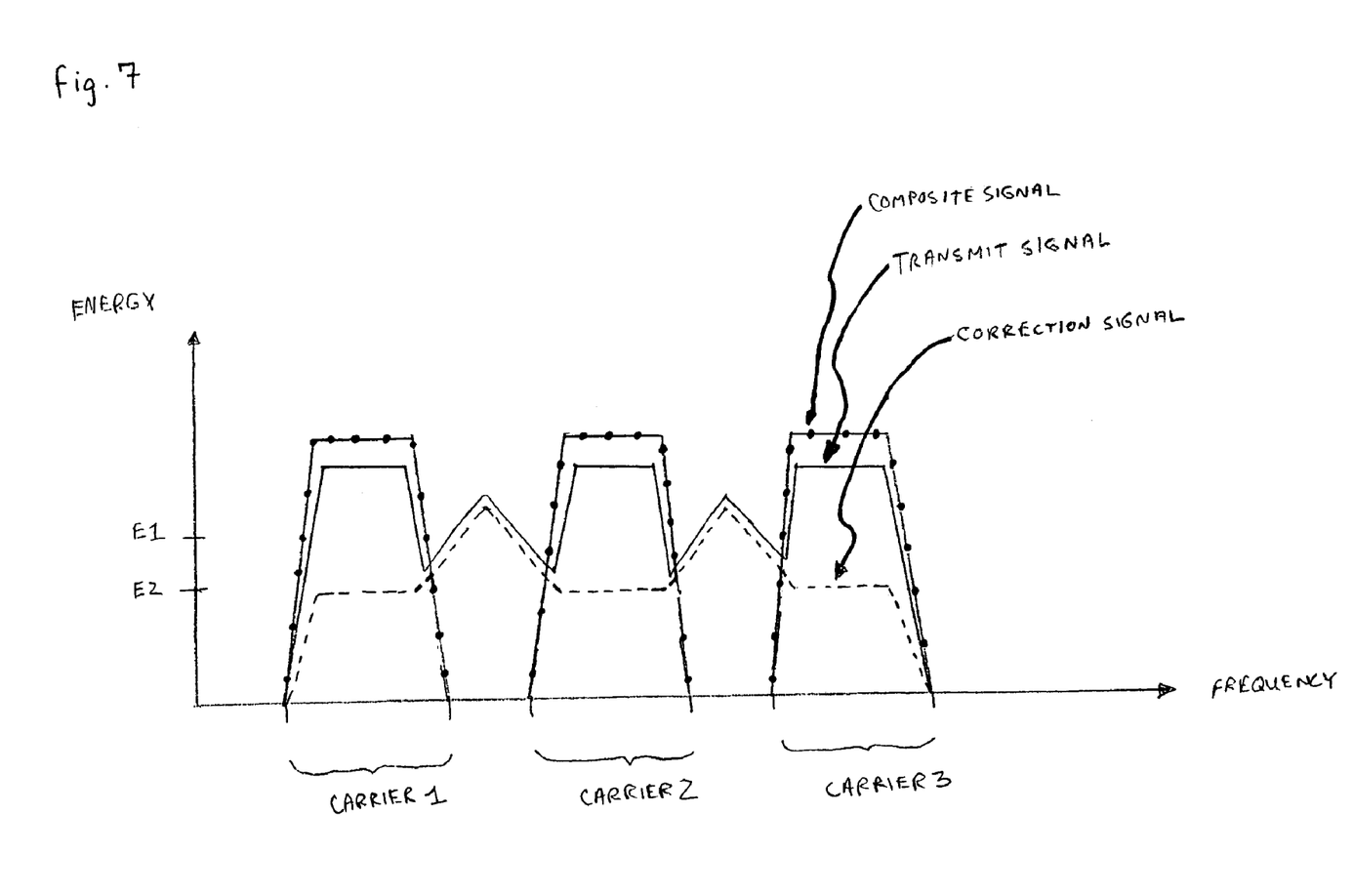
FIG. 7 is power spectral energy chart associated with the peak limiting device depicted in FIG. 5.

FIG. 7 is a power spectral energy graph of a composite signal Y(n) (shown in solid dotted lines), an exemplary correction signal that may be generated by the peak limiting device 60' (depicted in FIG. 5), and the resulting transmit signal. Here, the composite signal Y(n) has three carrier signals inclusive of carrier 1, carrier 2, and carrier 3. The carrier signals are provided at respective frequency bandwidths. The correction signal is shaped (by virtue of the clipping filter coefficients applied by the clipping filter 125') so that at least some of the energy of the correction signal is placed in the bandwidth gaps located between the respective frequency bandwidths of the carrier signals.

In FIG. 7, it will be appreciated that since the correction signal is subtracted from the peaks of the composite signal Y(n) (via the combiner 140), the resulting transmit signal has less energy than the composite signal Y(n). This subtraction feature is schematically illustrated in FIG. 2 via the "+" and "−" symbols associated with the respective inputs of the combiner 140. Further, since the correction signal has energy in the band gaps, the resulting transmit signal will also have energy in the band gaps.

As a result of placing energy in the bandwidth gaps, the correction signal may have an in-band power level of E2, which is less than the in-band power level of E1 associated with the conventional correction signal for a given PAR. In this regard, the exemplary embodiment of the present invention achieves an in-band noise reduction of E1-E2. In-band noise contributes to EVM. Thus, for a given PAR, the exemplary peak limiting device 60' may achieve a lower EVM (as compared to conventional devices). Alternatively, the exemplary peak limiting device 60' may provide a lower PAR for the same EVM (as compared to conventional devices).

The present invention is not limited to a specific amount of energy being placed in a bandwidth gap. Preferably, however, the resultant composite signal Z(n), which is output from the peak limiting device 60', has more energy in at least one bandwidth gap than the input composite signal Y(n). Further, FIG. 7 shows that an equal amount of energy may be placed in each of the bandwidth gaps. However, the invention is not limited in this regard. Further, the profile of the energy placed in the bandwidth gaps is not limited to the symmetric triangular shape depicted in FIG. 7. Finally, the invention is not limited to the three-carrier system depicted in FIG. 7 in that the invention can be practiced with a composite signal having more or less carrier signals.

Exemplary Clipping Filter Coefficients:

The following is an illustrative, non-limiting example of clipping filter coefficients that may be applied by the clipping filter 125' to spectrally shape the correction signal.

As discussed above, the clipping filter coefficients are designed to place correction signal energy into band gaps between bandwidths of carrier signals. Such design may be accomplished by taking advantage of the fact that the addition of time domain filter coefficients for multiple filters results in linear addition of the respective frequency responses of these filters in the frequency domain.

Consider a three-carrier system in digital baseband (prior to applicable RF frequency translation) with evenly spaced carriers and two band gaps between the carriers. Further consider filters that are designed, all with the same number of coefficients M=41 as follows.

Filter 1: designed to match the spectral shape of the carriers.

Filter 2: designed as a band-pass filter at the left band gap.

Filter 3: designed as a band-pass filter at the right band gap.

Filter 4: obtained by summing the coefficients of Filters 1, 2, and 3.

The coefficients for these filters are shown in the Table below.

| Filter 1 | Filter 2 | Filter 3 | Filter 4 |
|---|---|---|---|
| −0.0012 | 0.0021 − 0.0021i | 0.0021 + 0.0021i | 0.0030 |
| −0.0021 | 0.0031 − 0.0003i | 0.0031 + 0.0003i | 0.0041 |
| 0.0000 | 0.0033 + 0.0021i | 0.0033 − 0.0021i | 0.0066 |
| −0.0007 | 0.0017 + 0.0048i | 0.0017 − 0.00481 | 0.0027 |
| −0.0017 | −0.0022 + 0.0063i | −0.0022 − 0.0063i | −0.0061 |
| 0.0083 | −0.0074 + 0.0048i | −0.0074 − 0.0048i | −0.0065 |
| 0.0158 | −0.0112 − 0.0010i | −0.0112 + 0.0010i | −0.0066 |
| 0.0045 | −0.0103 − 0.0097i | −0.0103 + 0.0097i | −0.0161 |
| 0.0000 | −0.0025 − 0.0171i | −0.0025 + 0.0171i | −0.0050 |
| 0.0001 | 0.0103 − 0.0180i | 0.0103 + 0.0180i | 0.0207 |
| −0.0363 | 0.0225 − 0.0091i | 0.0225 + 0.0091i | 0.0087 |
| −0.0582 | 0.0268 + 0.0078i | 0.0268 − 0.0078i | −0.0046 |
| −0.0083 | 0.0183 + 0.0256i | 0.0183 − 0.0256i | 0.0283 |
| 0.0169 | −0.0016 − 0.0349i | −0.0016 + 0.0349i | 0.0137 |
| 0.0000 | −0.0249 + 0.0289i | −0.0249 − 0.0289i | −0.0498 |
| 0.0786 | −0.0403 + 0.0078i | −0.0403 − 0.0078i | −0.0020 |
| 0.1360 | −0.0387 − 0.0199i | −0.0387 + 0.0199i | 0.0586 |
| −0.0310 | −0.0190 − 0.0415i | −0.0190 + 0.0415i | −0.0690 |
| −0.1049 | 0.0111 − 0.0458i | 0.0111 + 0.0458i | −0.0827 |
| 0.2328 | 0.0377 − 0.0297i | 0.0377 + 0.0297i | 0.3082 |
| 0.5001 | 0.0483 | 0.0483 | 0.5967 |
| 0.2328 | 0.0377 + 0.0297i | 0.0377 − 0.0297i | 0.3082 |
| −0.1049 | 0.0111 + 0.0458i | 0.0111 − 0.0458i | −0.0827 |
| −0.0310 | −0.0190 + 0.0415i | −0.0190 − 0.0415i | −0.0690 |
| 0.1360 | −0.0387 + 0.0199i | −0.0387 − 0.0199i | 0.0586 |
| 0.0786 | −0.0403 − 0.0078i | −0.0403 + 0.0078i | −0.0020 |
| 0.0000 | −0.0249 − 0.0289i | −0.0249 + 0.0289i | −0.0498 |
| 0.0169 | −0.0016 − 0.0349i | −0.0016 + 0.0349i | 0.0137 |
| −0.0083 | 0.0183 − 0.0256i | 0.0183 + 0.0256i | 0.0283 |
| −0.0582 | 0.0268 − 0.0078i | 0.0268 + 0.0078i | −0.0046 |
| −0.0363 | 0.0225 + 0.0091i | 0.0225 − 0.0091i | 0.0087 |
| 0.0001 | 0.0103 + 0.0180i | 0.0103 − 0.0180i | 0.0207 |
| 0.0000 | −0.0025 + 0.0171i | −0.0025 − 0.0171i | −0.0050 |
| 0.0045 | −0.0103 + 0.0097i | −0.0103 − 0.0097i | −0.0161 |
| 0.0158 | −0.0112 + 0.0010i | −0.0112 − 0.0010i | −0.0066 |
| 0.0083 | −0.0074 − 0.0048i | −0.0074 + 0.0048i | −0.0065 |
| −0.0017 | −0.0022 − 0.0063i | −0.0022 + 0.0063i | −0.0061 |
| −0.0007 | 0.0017 − 0.0048i | 0.0017 + 0.0048i | 0.0027 |
| 0.0000 | 0.0033 − 0.0021i | 0.0033 + 0.0021i | 0.0066 |
| −0.0021 | 0.0031 + 0.0003i | 0.0031 − 0.0003i | 0.0041 |
| −0.0012 | 0.0021 + 0.0020i | 0.0021 − 0.0020i | 0.0030 |

Figure 8:
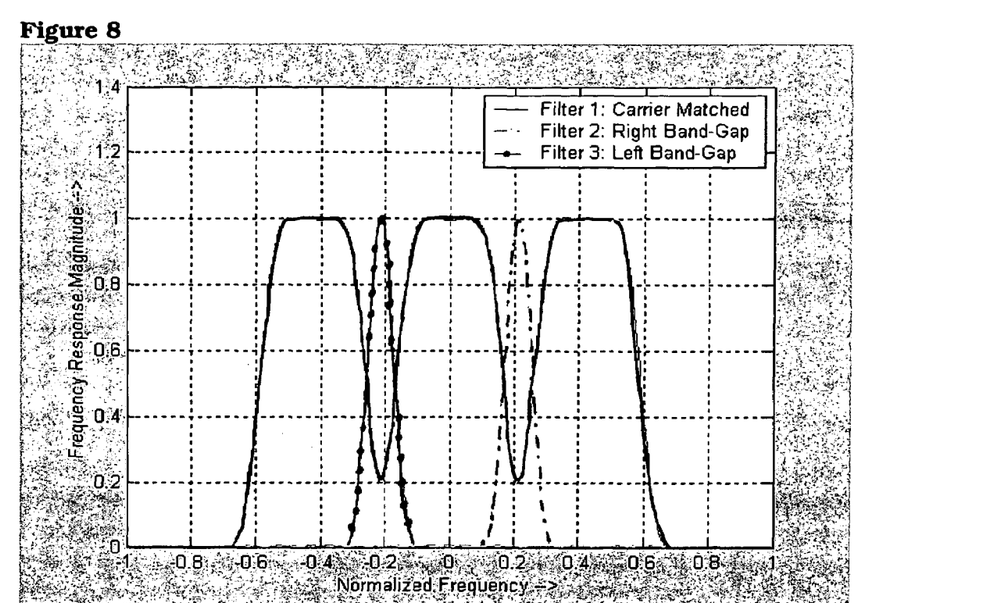
FIG. 8 is a frequency response chart associated with filters for spectrally shaping a correction signal.

FIG. 8 illustrates the frequency responses of filters 1, 2, and 3. As shown, the filters 2 and 3 respectively place energy in the band gaps.

Figure 9:
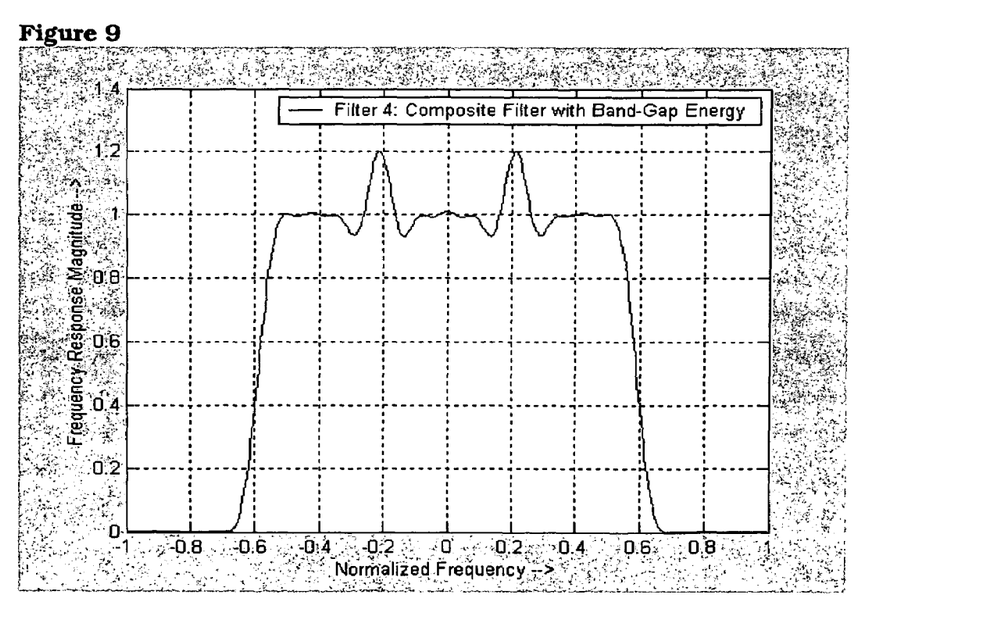
FIG. 9 is a frequency response chart associated with a combined filter for spectrally shaping a correction signal.

The corresponding coefficients of filters 1, 2, and 3 may be added together to obtain the coefficients for filter 4. FIG. 9 illustrates the frequency response of filter 4. Filter 4 accomplishes the energy placement in the band gaps between carriers as compared to filter 1, which may have been implemented in conventional techniques.

Numerous features of the invention including various and novel details of construction, combinations of parts and method steps have been particularly described with reference to the accompanying drawings. It will be understood that the particular peak limiting device and method embodying the invention is shown by way of illustration only and not as a limitations of the invention. The principles and features of this invention may be employed in varied and numerous embodiments without departing from the scope of the invention.

We claim:

1. A method of limiting at least one peak of a composite signal having at least three consecutive carrier signals, each carrier signal having a respective frequency bandwidth and being separated from an adjacent carrier signal by a bandwidth gap, the method comprising:

generating a correction signal based on at least one detected peak of the composite signal so that the correction signal has a spectral shape that places energy in each bandwidth gap interposed between the at least three consecutive carrier signals; and combining the correction signal and the composite signal so that the correction signal is located at the detected peak in time domain.

2. The method of claim 1, further comprising:

detecting the at least one peak of the composite signal from a window of samples of the composite signal;

multiplying the detected peak by a clipping factor to calculate a complex number; and multiplying the complex number by a sequence of clipping filter coefficients to determine the spectral shape of the correction signal.

3. The method of claim 1, further comprising:

repeating the generating step and the combining step for a plurality of sample windows of the composite signal.

4. The method of claim 1, further comprising combining the carrier signals to produce the composite signal.

5. The method of claim 1, further comprising:

performing the generating step for a plurality of detected peaks of the composite signal.

6. The method of claim 1, wherein the spectral shape of correction signal is such that a magnitude of energy in at least one bandwidth gap is greater than highest magnitudes of energy within the bandwidths of the carrier signals.

7. A system for limiting at least one peak of a composite signal having at least three consecutive carrier signals, each carrier signal having a respective frequency bandwidth and being separated from an adjacent carrier signal by a bandwidth gap, the system comprising:

a peak detector that detects at least one peak in the composite signal;

a clipping filter that generates a correction signal based on the detected peak, such that the correction signal has a spectral shape that occupies each bandwidth gap between the at least three consecutive carrier signals; and a combiner that combines the correction signal and the composite signal so that the correction signal is located at the detected peak in time domain.

8. The system of claim 7, wherein the clipping filter multiplies a set of clipping filter coefficients by a complex number to determine the spectral shape of the correction signal, the complex number being determined by multiplying a magnitude of the detected peak by clipping factor.

9. A device that generates a correction signal for limiting at least one peak of a composite signal representing at least three consecutive carrier signals, each carrier signal having a respective frequency bandwidth and being separated from an adjacent carrier signal by a bandwidth gap, the device comprising:

a memory including a look up table of clipping filter coefficients; and a multiplier multiplying a set of clipping filter coefficients by a complex number so that the correction signal is generated so as to have a spectral shape occupying each bandwidth gap between the at least three consecutive carrier signals.

10. A device that reduces peaks of an input composite signal representing at least three consecutive carrier signals, each carrier signal having a respective frequency bandwidth and being separated from an adjacent carrier signal by a bandwidth gap, the device comprising:

a peak detector that detects at least one peak in the input composite signal;

a clipping filter that generates a correction signal based on the detected peak; and a combiner that combines the correction signal and the input composite signal so that a resulting composite signal has more energy occupying at least one bandwidth gap between adjacent carrier signals than the input composite signal.

* * * * *